(12) United States Patent
Lee et al.

(10) Patent No.: US 8,743,192 B2
(45) Date of Patent: Jun. 3, 2014

(54) ELECTRONIC DEVICE AND IMAGE CAPTURE CONTROL METHOD USING THE SAME

(75) Inventors: Hou-Hsien Lee, Tu-Cheng (TW); Chang-Jung Lee, Tu-Cheng (TW); Chih-Ping Lo, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 547 days.

(21) Appl. No.: 13/034,624

(22) Filed: Feb. 24, 2011

(65) Prior Publication Data

US 2012/0098966 A1   Apr. 26, 2012

(30) Foreign Application Priority Data

Oct. 25, 2010   (TW) ................................ 99136392 A

(51) Int. Cl.
*H04N 9/47* (2006.01)
*H04N 7/18* (2006.01)
*G06K 9/00* (2006.01)

(52) U.S. Cl.
CPC ............ *H04N 7/183* (2013.01); *G06K 9/00617* (2013.01)
USPC ............................................................ 348/78

(58) Field of Classification Search
CPC ........................... H04N 7/183; G06K 9/00617
USPC ............................................................ 348/78
See application file for complete search history.

(56) References Cited

U.S. PATENT DOCUMENTS 6,154,559 A * 11/2000 Beardsley ..................... 382/103
6,757,422 B1 * 6/2004 Suzuki et al. ................. 382/154

* cited by examiner

*Primary Examiner* — Richard Torrente
(74) *Attorney, Agent, or Firm* — Novak Druce Connolly Bove + Quigg LLP

(57) ABSTRACT

A method for controlling an image capture device obtains an image captured by a camera of an electronic device, detects an eye area in the obtained image, and determines a matching subject template by comparing the detected eye area with a plurality of subject templates. The method further determines a control command corresponding to the matching subject template, and sends the control command to the image capture device to adjust movements of the image capture device.

13 Claims, 10 Drawing Sheets

US 8,743,192 B2

ELECTRONIC DEVICE AND IMAGE CAPTURE CONTROL METHOD USING THE SAME

BACKGROUND

1. Technical Field

Embodiments of the present disclosure relate to security surveillance technology, and particularly to an electronic device and image capture control method using the same.

2. Description of Related Art

Image capture devices perform security surveillance by capturing images of specific sites, and sending the captured images to a control computer. However, a position of the image capture device at the location must be adjusted manually by dedicated control software installed in the control computer. Therefore, an efficient method for controlling an image capture device is desirable.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
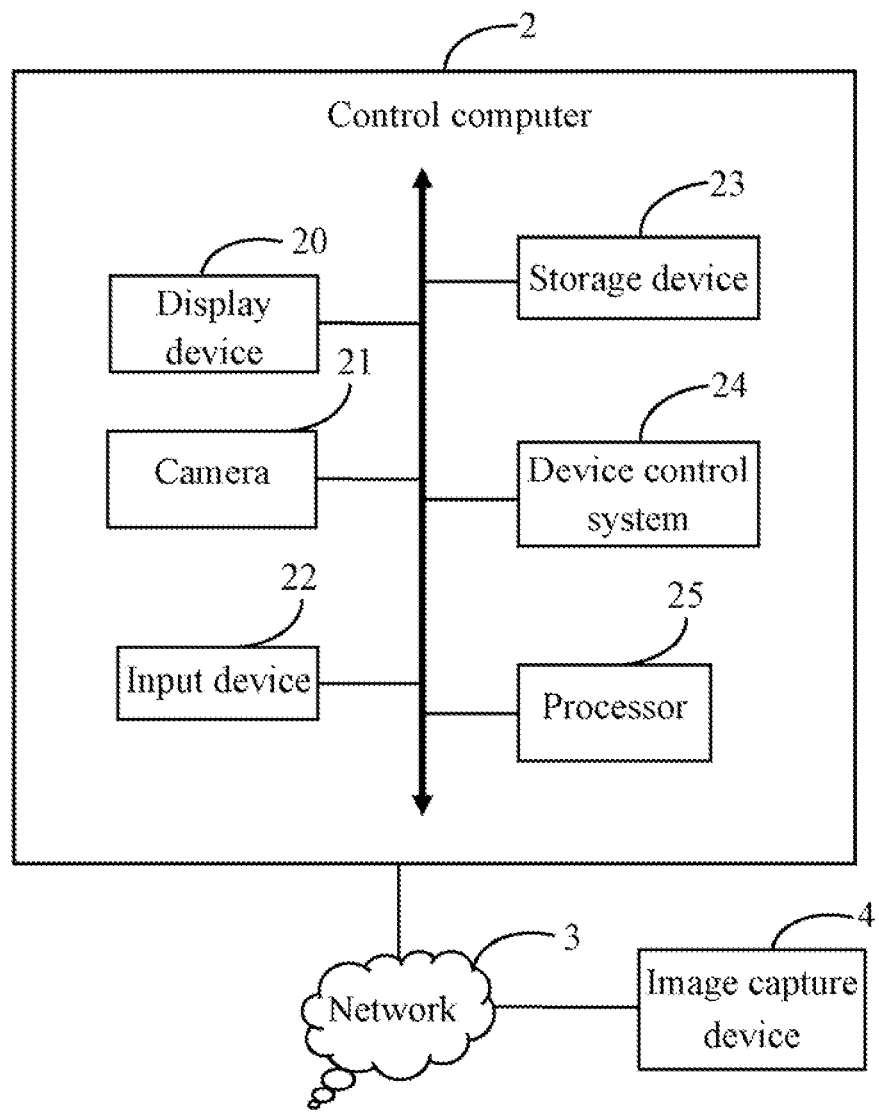
FIG. 1 is a schematic diagram of one embodiment of a control computer connected with an image capture device.
Figure 2:
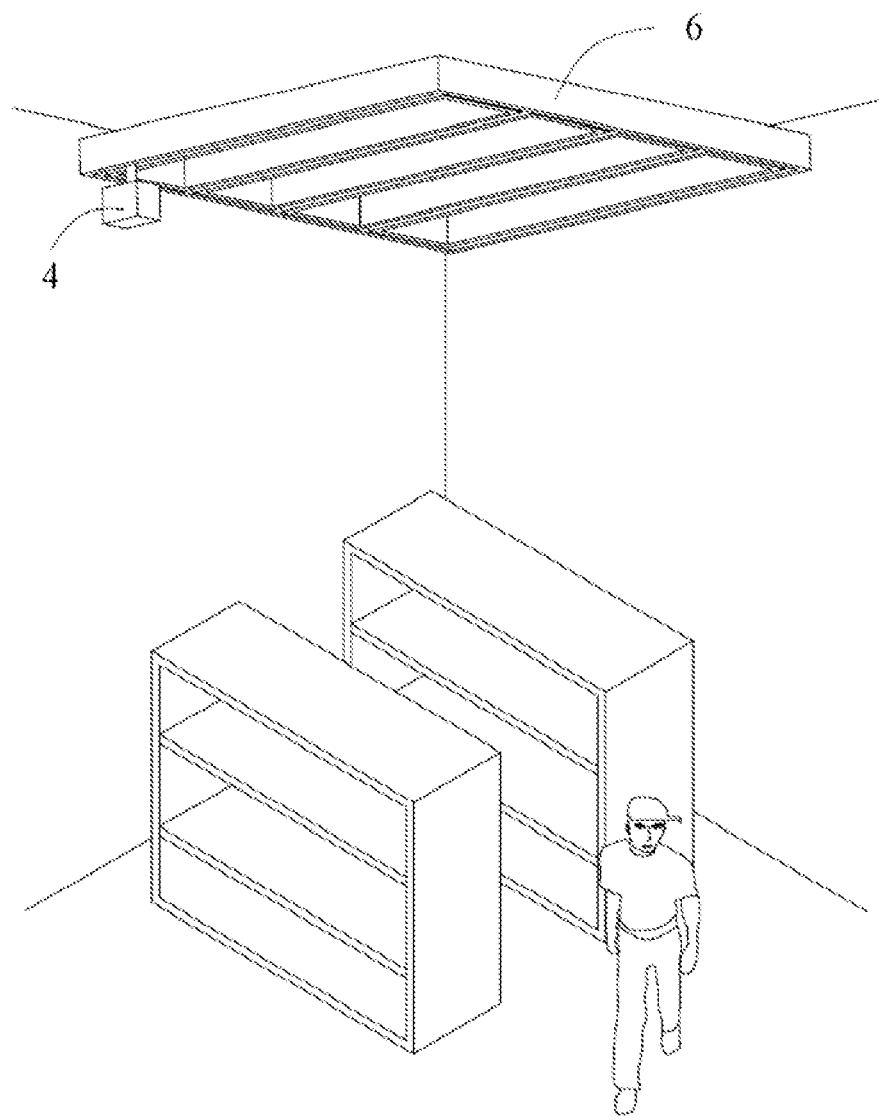
FIG. 2 is a schematic diagram of the image capture device installed in a rail system.

FIG. 1 is a schematic diagram of one embodiment of a control computer 2 connected with an image capture device 4 through a network 3. In one embodiment, the control computer 2 includes a display device 20, a camera 21, an input device 22, a storage device 23, a device control system 24, and at least one processor 25. Referring to FIG. 2, the image capture device 4 is installed on a rail system 6. The rail system 6 comprises one or more tracks that the device control system 24 may be used to control the image capture device 4 by moving along the tracks of the rail system 6. The device control system 24 adjusts a focal length of a lens of the image capture device 4 according to eye movements of a user.

In one embodiment, the image capture device 4 may be a speed dome camera or a pan/tilt/zoom (PTZ) camera, for example. The rail system 6 is installed at a vantage point onsite, such as the top of the monitored scene.

The camera 21 captures a plurality of eye images of a user of the device control system 24. The display device 20 may display monitored images captured by the image capture device 4, and the input device 22 may be a mouse or a keyboard used to input data.

Figure 3:
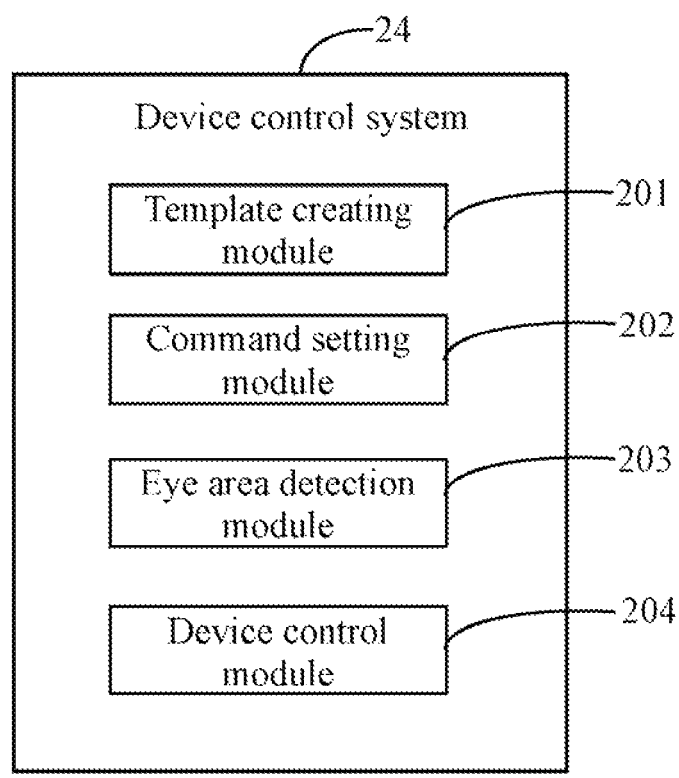
FIG. 3 is a block diagram of one embodiment of a device control system in the control computer.

FIG. 3 is a block diagram of one embodiment of the device control system 24 in the control computer 2. In one embodiment, the device control system 24 may include one or more modules, such as a template creating module 201, a command setting module 202, an eye area detection module 203, and a device control module 204. The one or more modules may comprise computerized code in the form of one or more programs that are stored in the storage device 23 (or memory). The computerized code includes instructions that are executed by the at least one processor 25 to provide functions for the one or more modules.

Figure 4:
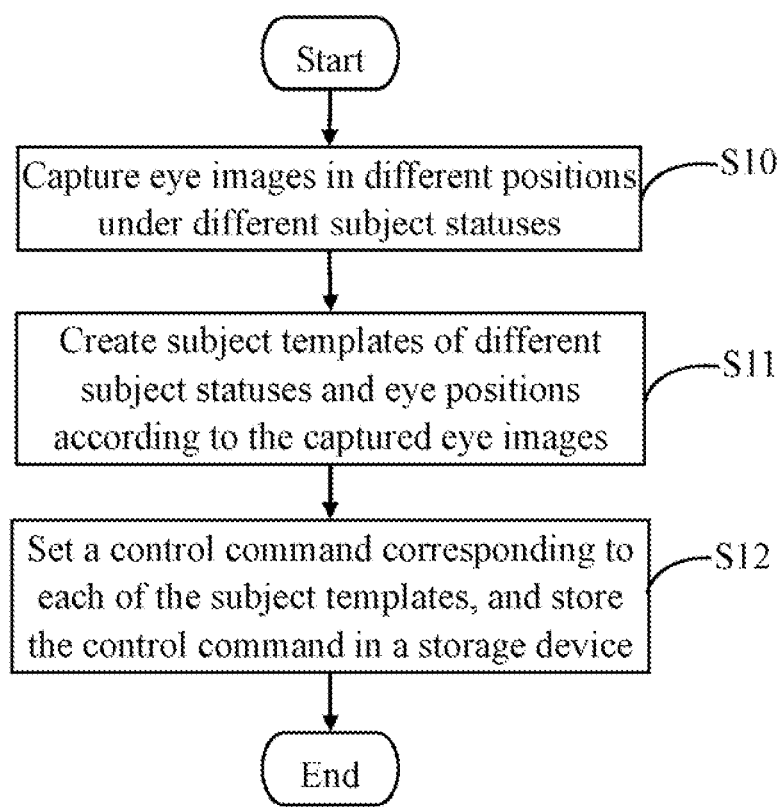
FIG. 4 is a flowchart of one embodiment of a method for setting subject templates and corresponding control commands for controlling the image capture device.

FIG. 4 is a flowchart of one embodiment of a method for setting subject templates and corresponding control commands for controlling the image capture device 4. Depending on the embodiment, additional blocks may be added, others removed, and the ordering of the blocks may be changed.

In block S10, the image capture device 4 captures images of eyes of different people in different positions under different subject statuses, and transfers the captured eye images to the control computer 2. In one embodiment, the subject statuses may include a normal status, a large status, and a small status of the eyes of the user of the device control system 24. A height of an eye area of the eye image under the normal status is greater than or equal to a first preset value, such as 1 centimeter, and less than or equal to a second preset value, such as 1.5 cm. A height of an eye area of the eye image under the large status is greater than the second preset value, and a height of an eye area of the eye image under the small status is less than the first preset value.

Figure 6A:
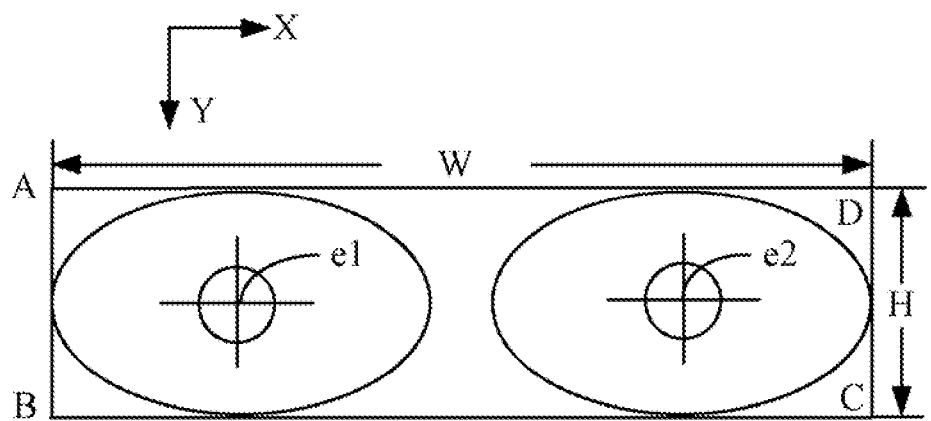
FIGS. 6A-6C are schematic diagrams of one embodiment of subject templates under different subject status.
Figure 6B:
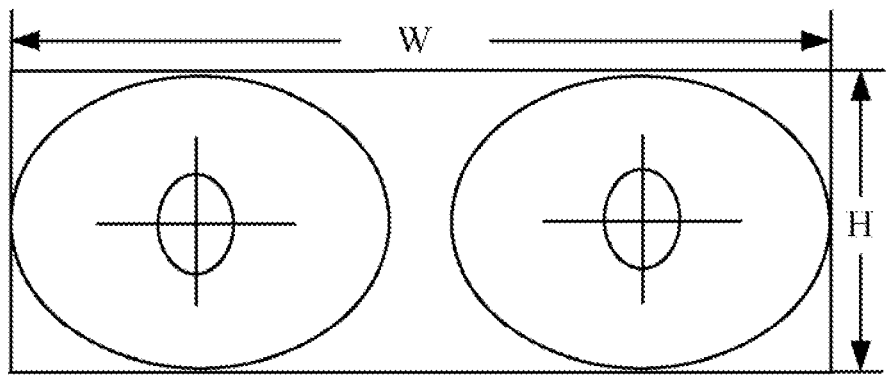
Figure 6C:
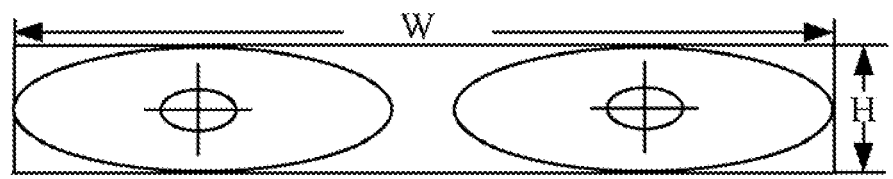

In block S11, the template creating module 201 creates subject templates of different subject statuses and eye positions according to the captured eye images. In one embodiment, the subject templates of different subject status include a subject template under normal status, such as FIG. 6A, a subject template under large status, such as FIG. 6B, and a subject template under small status, such as FIG. 6C. As shown in FIG. 6A, a smallest rectangle "ABCD" represents an eye area, "H" represents the height of the eye area, "e1" represents a position of a right eye in the eye area, and "e2" represents a position of a left eye in the eye area. The point "A" represents an origin of a coordinate system based on the eye area.

For example, a height of an eye area of the subject template under the normal status is greater than or equal to the first preset value and less than or equal to the second preset value. A height of an eye area of the subject template under the large status is greater than the second preset value, and a height of an eye area of the subject template under the small status is less than the first preset value.

Figure 7A:
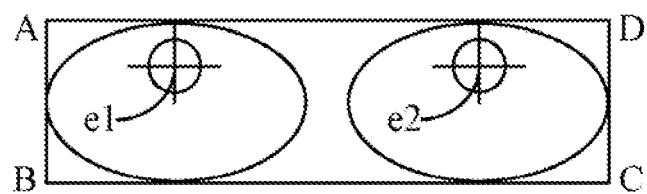
FIGS. 7A-7B are schematic diagrams of one embodiment of subject templates when a subject eye moves upward or downward.
Figure 7B:
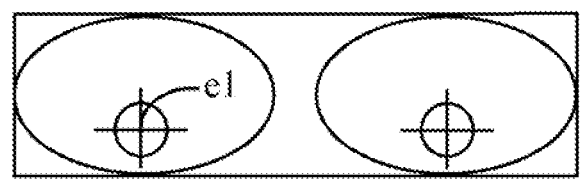
Figure 8A:
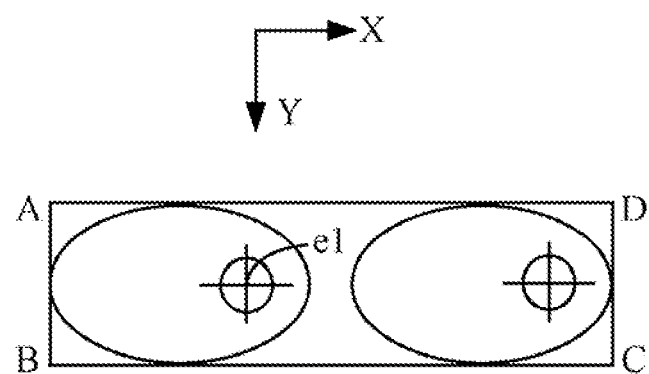
FIGS. 8A-8B are schematic diagrams of one embodiment of subject templates when a subject eye moves left or right.
Figure 8B:
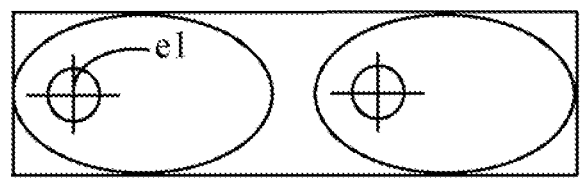
Figure 9A:
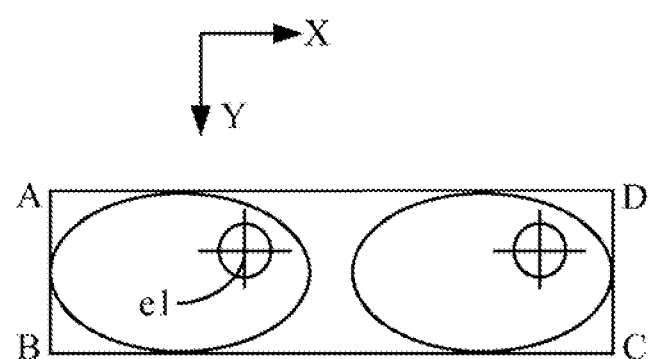
FIGS. 9A-9B are schematic diagrams of one embodiment of subject templates when a subject eye moves upper-left or down-left.
Figure 9B:
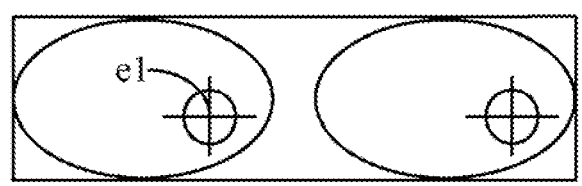
Figure 10A:
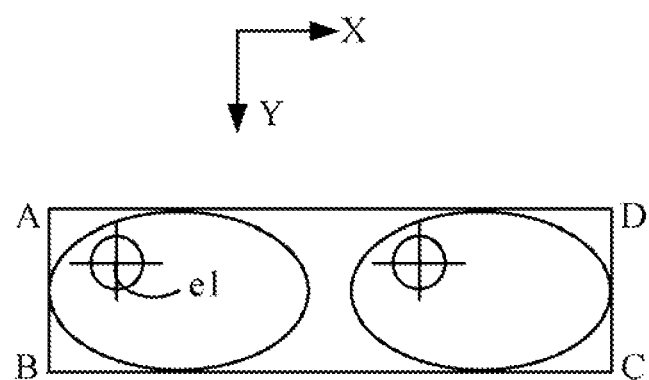
FIGS. 10A-10B are schematic diagrams of one embodiment of subject templates when a subject eye moves upper-right or down-right.
Figure 10B:
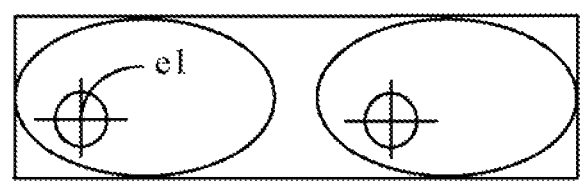

In one embodiment, the subject templates of different eye positions are set under the normal status of the user's eyes. The subject templates of different eye positions include a subject template when one of the eyes is still, a subject template when one of the eyes moves upward, such as FIG. 7A, a subject template when one of the eyes moves downward, such as FIG. 7B, a subject template when one of the eyes moves left, such as FIG. 8A, a subject template when one of the eyes moves right, such as FIG. 8B, a subject template when one of the eyes moves upper-left, such as FIG. 9A, a subject template when one of the eyes moves down-left, such as FIG. 9B, a subject template when one of the eyes moves upper-right, such as FIG. 10A, and a subject template when one of the eyes moves down-right, such as FIG. 10B.

For example, if a right eye of a user is still, a range of an X-axis coordinate of a right eye is [1.8, 2.2], and a range of a Y-axis coordinate of the right eye is [2.8, 3.2]. The other subject templates of different eye positions may be created according to the subject template when one of the eyes is still. For example, if the right eye of the user moves rightward, a range of an X-axis coordinate of the right eye is [1, 1.8), and a range of a Y-axis coordinate of the right eye is [2.8, 3.2]. If the right eye moves upward, a range of an X-axis coordinate of the right eye is [1.8, 2.2], and a range of a Y-axis coordinate of the right eye is [2, 2.8). If the right eye moves toward upper-right, a range of an X-axis coordinate of the right eye is [1, 1.8), and a range of a Y-axis coordinate of the right eye is [2, 2.8).

In block S12, a control command corresponding to each of the subject templates is set using the command setting module 202 and stored in the storage device 23 of the control computer 2. In other embodiments, the control computer 2 may be other suitable electronic device, such as a personal digital assistant (PDA).

For example, if one of the eyes of a user is still, the control command corresponding to the subject template is used to stop the image capture device 4. If one of the eyes moves upward, the control command corresponding to the subject template is used to control the image capture device 4 moving forward along the tracks of the rail system 6. If one of the eyes moves downward, the control command corresponding to the subject template is used to control the image capture device 4 moving backward along the tracks of the rail system 6.

For example, if one of the eyes of a user moves towards upper-left, the control command corresponding to the subject template is used to control the lens of the image capture device 4 moving upward. If one of the eyes moves towards down-left, the control command corresponding to the subject template is used to control the lens of the image capture device 4 moving left.

Furthermore, if the subject status is the large status, the control command corresponding to the subject template is used to zoom out the lens of the image capture device 4. If the subject status is the small status, the control command corresponding to the subject template is used to zoom in the lens of the image capture device 4.

Figure 5:
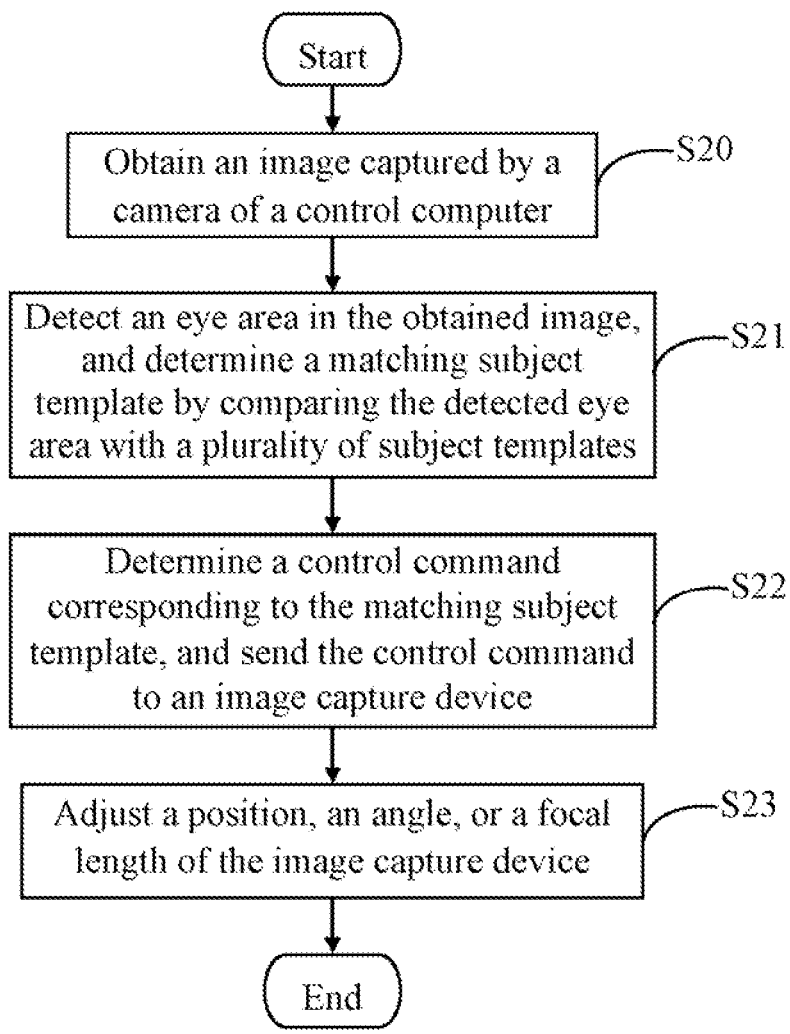
FIG. 5 is a flowchart of one embodiment of a method for controlling the image capture device using the electronic device.

FIG. 5 is a flowchart of one embodiment of a method for controlling the image capture device 4 using the control computer 2. Depending on the embodiment, additional blocks may be added, others removed, and the ordering of the blocks may be changed.

In block S20, the eye area detection module 203 obtains an image captured by the camera 21 of the control computer 2.

In block S21, the eye area detection module 203 detects an eye area in the obtained image using an eye detection method, and determines a matching subject template by comparing the detected eye area with a plurality of subject templates according to a height of the detected eye area and coordinates of an eye in the detected eye area. In one embodiment, the eye detection method may be a template matching method using neural network training algorithm and adaptive boosting (AdaBoost) algorithm. It may be understood that, in other embodiments, the eye area detection module 203 may determine the matching subject template by comparing the detected eye area with the plurality of subject templates according to the height of the detected eye area and coordinates of two eyes in the detected eye area.

If the height of the detected eye area is greater than the second preset value corresponding to the subject template under the large status, the eye area detection module 203 obtains the subject template under the large status.

If the height of the detected eye area is less than the first preset value corresponding to the subject template under the small status, the eye area detection module 203 obtains the subject template under the small status.

If the height of the detected eye area is greater than or equal to the first preset value and less than or equal to the second preset value, the eye detection module 203 obtains a matching subject template from the subject templates of different eye positions according to an X-axis coordinate and a Y-axis coordinate of the eye in the detected eye area.

In block S22, the device control module 204 determines a control command corresponding to the matching subject template from the storage device 23, and sends the control command to the image capture device 4 through the network 3.

In block S23, the device control module 204 adjusts a position of the image capture device 4, and an angle or a focal length of a lens of the image capture device 4 according to the control command.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for controlling an image capture device using an electronic device, the method comprising:
obtaining an image captured by a camera of the electronic device;
detecting an eye area of an eye of a user in the obtained image using an eye detection method, and determining a matching subject template that matches the detected eye area, the determining of the matching subject template according to comparison of the detected eye area with a plurality of subject templates according to a height of the detected eye area and coordinates of the eye in the detected eye area, the plurality of subject templates comprising subject templates of different subject status and subject templates of different eye positions;
the subject templates of different subject status comprising: a subject template under a normal status, a subject template under a large status, and a subject template under a small status of the eye of the user, a height of an eye area of the subject template under the normal status is greater than or equal to the first preset value and less than or equal to the second preset value, a height of an eye area of the subject template under the large status is greater than the second preset value, and a height of an eye area of the subject template under the small status is less than the first preset value;
the subject templates of different eye positions comprising: when one of the eyes is still, when one of the eyes moves upward, when one of the eyes moves downward, when one of the eyes moves left, when one of the eyes moves right, when one of the eyes moves upper-left, when one of the eyes moves down-left, when one of the eyes moves upper-right, and when one of the eyes moves down-right;

the matching subject template being obtained from the subject templates of different subject status according to the height of the detected eye area when the height of the detected eye area is less than a first preset value or greater than a second preset value;

the matching subject template being obtained from the subject templates of different eye positions according to the coordinate of the eye in the detected eye area when the height of the detected eye area is greater than or equal to the first preset value and less than or equal to the second preset value;

determining a control command corresponding to the matching subject template; and adjusting at least one of a position of the image capture device, an angle or a focal length of a lens of the image capture device according to the control command.

2. The method according to claim 1, further comprising:
obtaining eye images captured by the camera of the electronic device in different positions under different subject statuses; and
creating the subject templates according to the captured eye images.

3. The method according to claim 2, further comprising:
setting the control command corresponding to each of the subject templates, and storing the control command in a storage device of the electronic device.

4. The method according to claim 1, wherein the step of determining a matching subject template comprises:
obtaining the subject template under the large status upon the condition that the height of the detected eye area is greater than the second preset value corresponding to the subject template under the large status;
obtaining the subject template under the small status upon the condition that the height of the detected eye area is less than the first preset value corresponding to the subject template under the small status; or
obtaining a matching subject templates from the subject templates of different eye positions according to an X-axis coordinate and a Y-axis coordinate of the eye in the detected eye area upon the condition that the height of the detected eye area is greater than or equal to the first preset value and less than or equal to the second preset value.

5. An electronic device that controls an image capture device, comprising:
a camera;
a storage device;
at least one processor; and
one or more modules that are stored in the storage device and are executed by the at least one processor, the one or more modules comprising instructions:
to obtain an image captured by the camera of the electronic device;
to detect an eye area of an eye of a user in the obtained image using an eye detection method, and determine a matching subject template that matches the detected eye area, the determining of the matching subject template according to comparison of the detected eye area with a plurality of subject templates according to a height of the detected eye area and coordinates of the eye in the detected eye area, the plurality of subject templates comprising subject templates of different subject status and subject templates of different eye positions;

the subject templates of different subject status comprising: a subject template under a normal status, a subject template under a large status, and a subject template under a small status of the eye of the user, a height of an eye area of the subject template under the normal status is greater than or equal to the first preset value and less than or equal to the second preset value, a height of an eye area of the subject template under the large status is greater than the second preset value, and a height of an eye area of the subject template under the small status is less than the first preset value;

the subject templates of different eye positions comprising: when one of the eyes is still, when one of the eyes moves upward, when one of the eyes moves downward, when one of the eyes moves left, when one of the eyes moves right, when one of the eyes moves upper-left, when one of the eyes moves down-left, when one of the eyes moves upper-right, and when one of the eyes moves down-right;

the matching subject template being obtained from the subject templates of different subject status according to the height of the detected eye area when the height of the detected eye area is less than a first preset value or greater than a second preset value;

the matching subject template being obtained from the subject templates of different eye positions according to the coordinate of the eye in the detected eye area when the height of the detected eye area is greater than or equal to the first preset value and less than or equal to the second preset value;

to determine a control command corresponding to the matching subject template; and to adjust at least one of a position of the image capture device, an angle or a focal length of a lens of the image capture device according to the control command.

6. The electronic device according to claim 5, wherein the one or more modules further comprise instructions:
obtaining eye images captured by the camera of the electronic device in different positions under different subject statuses; and
creating the subject templates according to the captured eye images.

7. The electronic device according to claim 6, wherein the one or more modules further comprise instructions: setting the control command corresponding to each of the subject templates, and storing the control command in a storage device of the electronic device.

8. The electronic device according to claim 5, wherein the instruction to determine a matching subject template comprises:
obtaining the subject template under the large status upon the condition that the height of the detected eye area is greater than the second preset value corresponding to the subject template under the large status;
obtaining the subject template under the small status upon the condition that the height of the detected eye area is less than the first preset value corresponding to the subject template under the small status; or
obtaining a matching subject templates from the subject templates of different eye positions according to an X-axis coordinate and a Y-axis coordinate of the eye in the detected eye area upon the condition that the height of the detected eye area is greater than or equal to the first preset value and less than or equal to the second preset value.

9. A non-transitory storage medium having stored thereon instructions that, when executed by a processor of an electronic device, causes the processor to perform a method for controlling an image capture device, the method comprising:
- obtaining an image captured by a camera of the electronic device;
- detecting an eye area of an eye of a user in the obtained image using an eye detection method, and determining a matching subject template that matches the detected eye area, the determining of the matching subject template according to comparison of the detected eye area with a plurality of subject templates according to a height of the detected eye area and coordinates of the eye in the detected eye area, the plurality of subject templates comprising subject templates of different subject status and subject templates of different eye positions;
- the subject templates of different subject status comprising: a subject template under a normal status, a subject template under a large status, and a subject template under a small status of the eye of the user, a height of an eye area of the subject template under the normal status is greater than or equal to the first preset value and less than or equal to the second preset value, a height of an eye area of the subject template under the large status is greater than the second preset value, and a height of an eye area of the subject template under the small status is less than the first preset value;
- the subject templates of different eye positions comprising: when one of the eyes is still, when one of the eyes moves upward, when one of the eyes moves downward, when one of the eyes moves left, when one of the eyes moves right, when one of the eyes moves upper-left, when one of the eyes moves down-left, when one of the eyes moves upper-right, and when one of the eyes moves down-right;
- the matching subject template being obtained from the subject templates of different subject status according to the height of the detected eye area when the height of the detected eye area is less than a first preset value or greater than a second preset value;
- the matching subject template being obtained from the subject templates of different eye positions according to the coordinate of the eye in the detected eye area when the height of the detected eye area is greater than or equal to the first preset value and less than or equal to the second preset value;
- determining a control command corresponding to the matching subject template; and
- adjusting at least one of a position of the image capture device, an angle or a focal length of a lens of the image capture device according to the control command.

10. The non-transitory storage medium according to claim 9, wherein the method further comprises:
- obtaining eye images captured by the camera of the electronic device in different positions under different subject statuses; and
- creating the subject templates according to the captured eye images.

11. The non-transitory storage medium according to claim 10, wherein the method further comprises: setting the control command corresponding to each of the subject templates, and storing the control command in a storage device of the electronic device.

12. The non-transitory storage medium according to claim 9, wherein the step of determining a matching subject template comprises:
- obtaining the subject template under the large status upon the condition that the height of the detected eye area is greater than the second preset value corresponding to the subject template under the large status;
- obtaining the subject template under the small status upon the condition that the height of the detected eye area is less than the first preset value corresponding to the subject template under the small status; or
- obtaining a matching subject templates from the subject templates of different eye positions according to an X-axis coordinate and a Y-axis coordinate of the eye in the detected eye area upon the condition that the height of the detected eye area is greater than or equal to the first preset value and less than or equal to the second preset value.

13. The non-transitory storage medium according to claim 9, wherein the medium is selected from the group consisting of a hard disk drive, a compact disc, a digital video disc, and a tape drive.

* * * * *